US008589801B2

(12) United States Patent
Soon et al.

(10) Patent No.: US 8,589,801 B2
(45) Date of Patent: Nov. 19, 2013

(54) DISPLAY SCREEN USER IDENTIFICATION CARD FOR ACCESS TO SECURED DATABASES

(75) Inventors: Hoon Weng Soon, Austin, TX (US);
Jessica Mong Joo Tan, Austin, TX (US);
Liang Zee Wee, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 388 days.

(21) Appl. No.: 12/955,446

(22) Filed: Nov. 29, 2010

(65) Prior Publication Data

US 2012/0137225 A1   May 31, 2012

(51) Int. Cl.
*G06F 3/00*   (2006.01)
*G06K 19/06*   (2006.01)
*G06K 7/14*   (2006.01)

(52) U.S. Cl.
USPC ........... 715/741; 235/380; 235/454; 235/455; 235/462.01; 235/494; 726/2

(58) Field of Classification Search
USPC ............. 715/741; 235/380, 454–456, 462.01, 235/494; 726/2
See application file for complete search history.

(56) References Cited

U.S. PATENT DOCUMENTS

| 5,486,946 | A | * | 1/1996 | Jachimowicz et al. | 359/263 |
| 5,728,998 | A | * | 3/1998 | Novis et al. | 235/380 |
| 5,763,863 | A | * | 6/1998 | Grosfeld et al. | 235/462.36 |
| 6,089,451 | A | * | 7/2000 | Krause | 235/380 |
| 6,991,155 | B2 | * | 1/2006 | Burchette, Jr. | 235/379 |
| 8,015,552 | B1 | * | 9/2011 | Lindahl et al. | 717/128 |
| 8,082,575 | B2 | * | 12/2011 | Doughty et al. | 726/2 |
| 2006/0018021 | A1 | | 1/2006 | Tomkins et al. | |
| 2008/0148352 | A1 | | 6/2008 | Matsumoto et al. | |

FOREIGN PATENT DOCUMENTS

WO   WO 2005/112009 A2   11/2005

* cited by examiner

*Primary Examiner* — Tadeese Hailu
(74) *Attorney, Agent, or Firm* — J. B. Kraft; Steven L. Bennett

(57) ABSTRACT

An identification card with a planar member having a plurality of apertures formed therein and a plurality of prisms, each respectively mounted in one of the apertures so as to produce a refraction of a selected color of light transmitted through the aperture different from the refraction of a color of light transmitted through the other prisms in the plurality of other apertures.

12 Claims, 4 Drawing Sheets

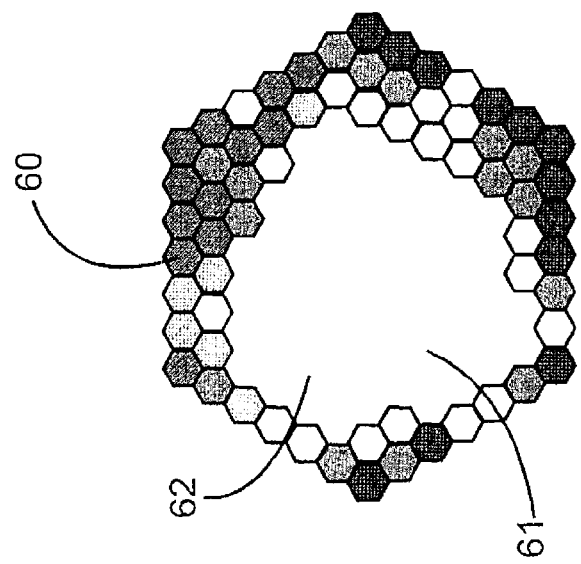
FIG. 6
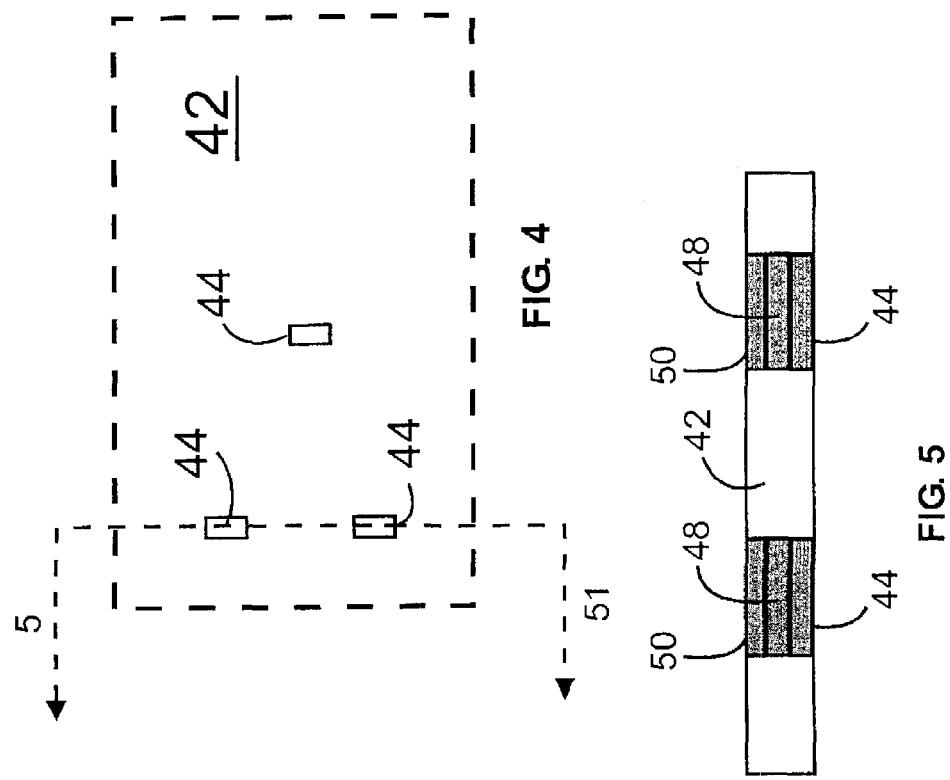
FIG. 4
FIG. 5

DISPLAY SCREEN USER IDENTIFICATION CARD FOR ACCESS TO SECURED DATABASES

BACKGROUND

The present invention relates to permitting properly identified user access to secured databases and particularly to such user identification through a computer controlled interactive display interface. Over the past generation, the amount of commerce conducted through user interactive computer controlled display interfaces has been rapidly increasing. From commercial and personal on-line orders of products and services to monetary banking transactions, user interactive terminal transactions have been increasing at high acceleration. Since such commercial transactions involve communications between a user at a display terminal remotely connected to a source via a network, particularly the Internet or World Wide Web (Web)(these terms are used interchangeably herein), it is necessary to verify or confirm user identity. The user identification implementation should be: hard to counterfeit; user intuitive; and relatively easy to implement.

BRIEF SUMMARY

According to one aspect of the present invention, interactive user identification is implemented by the use of an identification card comprising a planar member having a plurality of apertures formed therein and a plurality of prisms, each respectively mounted in one of the apertures so as to produce a refraction of a selected color of light transmitted through the aperture different from the refraction of a color of light transmitted through the other prisms in the plurality of other apertures. The plurality of prisms provides a pattern of the selected refracted colors representing a unique identification for said card.

According to another aspect of the invention, a computer controlled display system with display screen user identification is provided and comprises a displayed area providing a plurality of identifying colors respectively at positions within the area, and a displayed alignment marker for aligning an identification card placed against the display screen with the area providing identifying colors.

The aligned identification card includes a planar member having a plurality of apertures formed therein and a plurality of prisms, each respectively mounted in one of said apertures so as to produce a refraction of a color of light different from the refraction of a color of light transmitted through the other plurality of prisms, wherein the plurality of prisms respectively refract each of the identifying colors to provide a pattern of the refracted identifying colors representing a unique identification for the user.

Another aspect of the invention involves displaying a table enabling a viewer to convert the pattern of refracted identifying colors into an identifying numerical sequence. Said data entry apparatus enables the viewer to enter the numerical sequence to obtain access to the computer controlled display system.

BRIEF DESCRIPTION OF THE SEVERAL VIEWS OF THE DRAWINGS

The present invention will be better understood and its numerous objects and advantages will become more apparent to those skilled in the art by reference to the following drawings, in conjunction with the accompanying specification, in which:

FIG. 4 is a diagrammatic top view of an identifier card embodiment according to this invention; and FIG. 5 is a sectional view of the card of FIG. 4, along view lines 5-5'; and FIG. 6 is a diagrammatic view of a user interactive displayed color hexagon that may be used by a viewer to enter the sequential pattern of colors that the viewer perceives using the identifier card.

DETAILED DESCRIPTION

Figure 1:
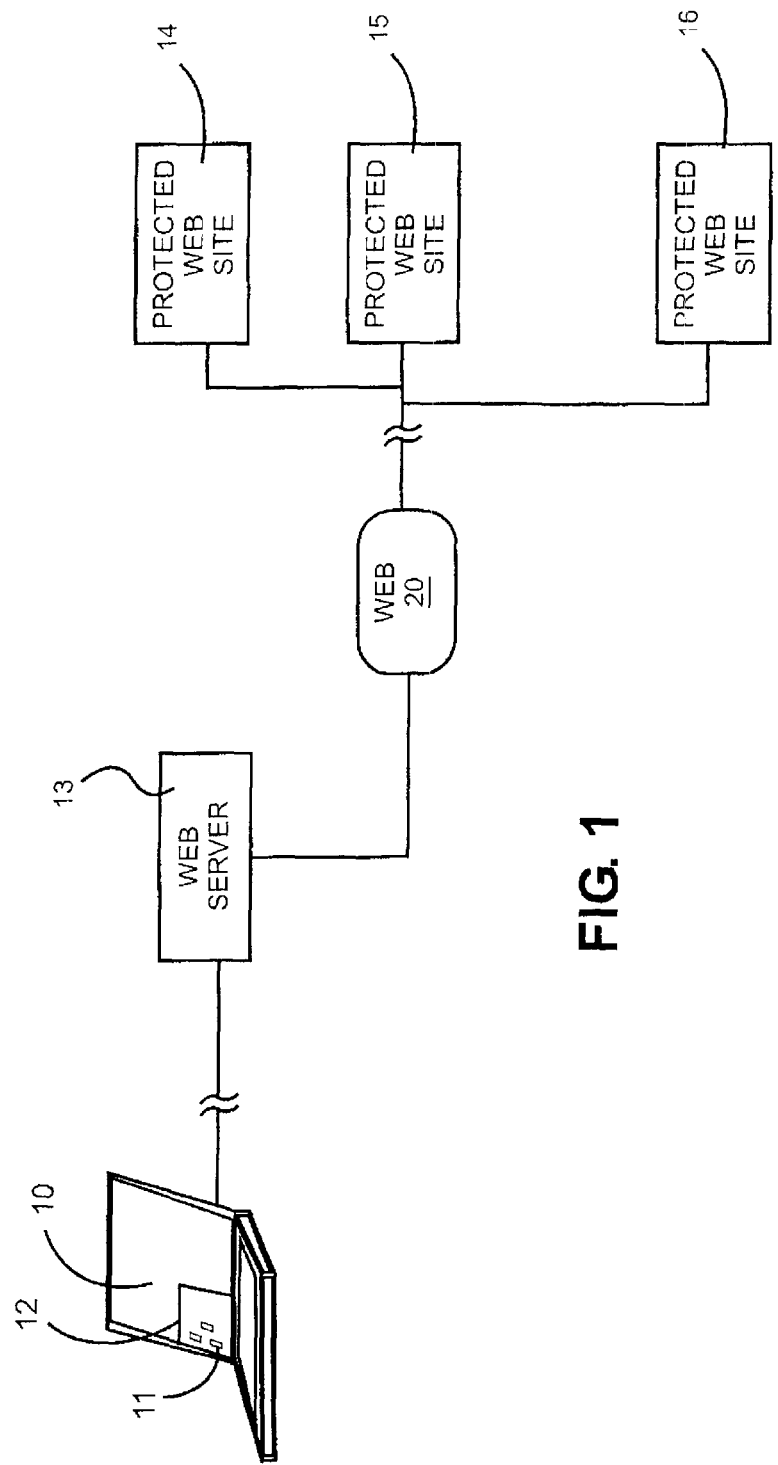
FIG. 1 is a generalized diagrammatic view of a network portion, illustrating the global relationship between the an identifier card, the display screen on a network terminal computer and protected network (Web) sites.

Referring to FIG. 1, there is shown a generalized diagrammatic view of a network portion to illustrate how the identification card functions in accessing secured or protected sites trough a network, such as the Web, 20. A user at a terminal 10, a computer controlled display, wishes to access any protected site 14 through 16 via Web server 13 and the Web 20. An identification card 11 is placed at a designated position flat against the face of the display screen of computer terminal 10. The identification card 11 has a plurality of apertures 12 through which user readable colors of light transmitted through prisms in apertures 12 provide a color pattern that the user can translate into a unique user identifying pattern that the user may enter for access to protected sites. This will be described in greater detail hereinafter with respect to FIGS. 2, 4 and 5.

Figure 2:
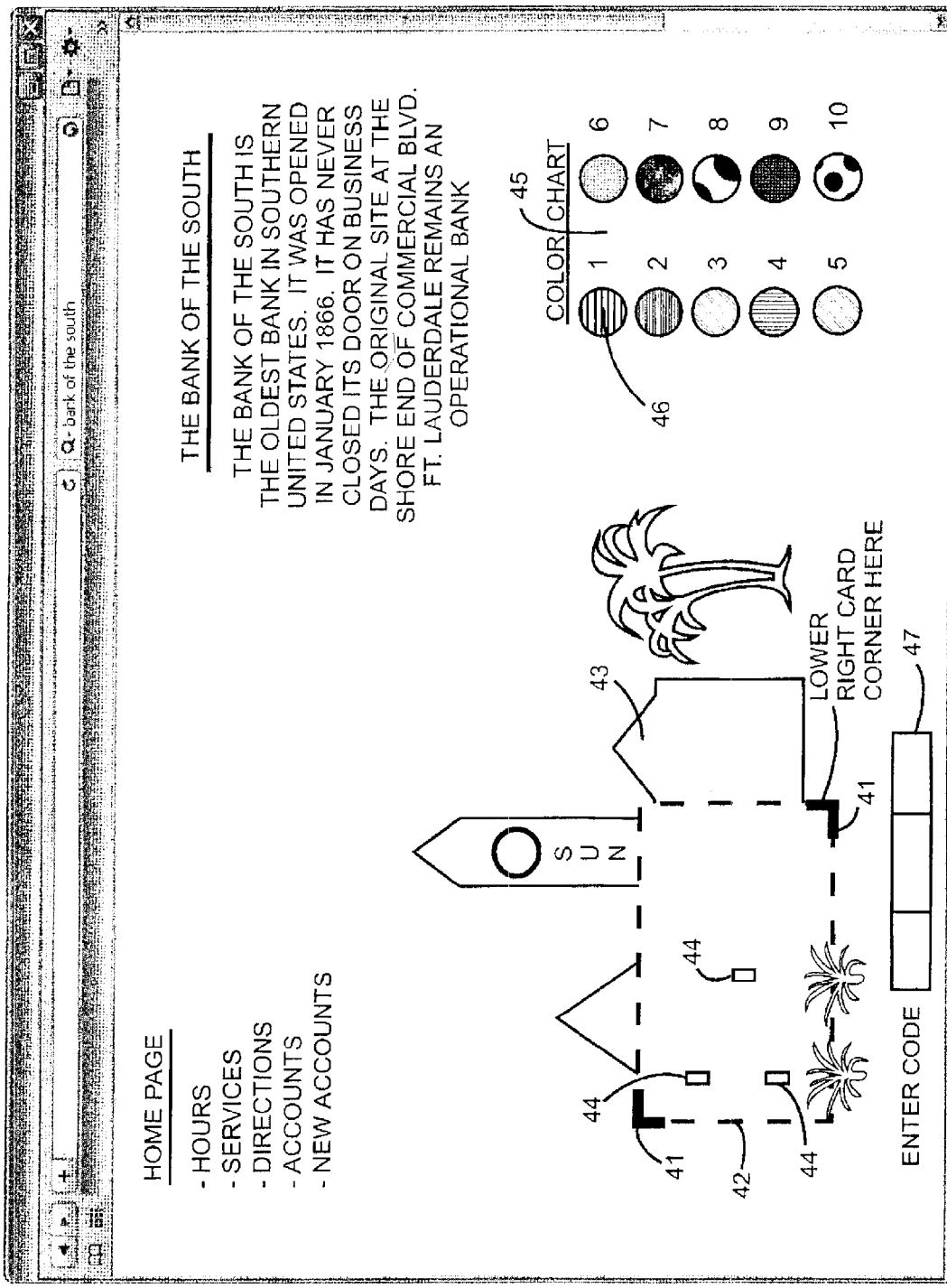
FIG. 2 is an illustrative diagrammatic view of a computer system that may be used for any of the computer controlled display terminals on which a user may access a selected network through an identifier card.

With reference to FIG. 2, a user interface 40 to the desired protected site is accessed over the Web and displayed on the user's display computer terminal. In the illustration, the user interface 40 is a typical Web page for the protected site, a bank. The page has written descriptive material and graphic images 43. The Web page interface has a pair of registration marks 41 designating a pair of diagonal corners with which the diagonal corners of identification card 42, shown in dashed lines, must coincide when the card 42 is placed flat against the surface of interface screen 40. Thus placed, apertures 44 in identification card 42 will be in registration with three predetermined locations on the screen, each having a predetermined color. It is the colors at the screen locations that register or coincide with apertures 44 and that will be refracted through the prisms in the apertures to provide, in this case a three unit, perceived color pattern to the viewing user. It should be noted that the selected colors at the screen locations that are transmitted and refracted through the respective prisms in the apertures may form part of the visual content of the Web page display images 43. The user may then translate the refracted colors that he has viewed in a numerical pattern through color chart 45 for converting colors 46 to numbers. The user enters the numerical code 47 to validate his identification and obtain entry to the protected Web site.

As an alternative embodiment to the color chart 45, the viewer my use a color hexagon that may be available from graphical user interfaces (GUIs) provided by conventional operating systems and applications for such operating systems that enable a user to color or paint objects being created on the GUI. Such a color hexagon, as shown in FIG. 6, may be used in place of the chart 45 in the display interface 40, FIG. 1. Thus, the viewer may select the color units 61, 62 that most closely correspond to the colors appearing in the card apertures. Upon such sequential selection of color units 61, 62 in color hexagon 60, corresponding sequential numerals will appear in code entry 47 and serve as the user's identification.

The operation of the identification card 42 may be better understood with reference to FIG. 4, which is a top view of the card, and FIG. 5, which is a cross-sectional view. Apertures 44 have prisms 48 mounted therein. It is preferable that each prism produce a refraction of the color of the light transmitted that is different from the refraction of the color of the other prisms in the plurality of prisms. The manner in which the prisms produce such differences in refraction may be by any standard prism function. The prism effect is based upon the principle that light changes speed as it moves from one medium to another, i.e. the speed of the transmitted light changes as it moves from air into the transparent material of the prism (e.g. a variety of glass or plastic material). This change in speed effects a refraction, i.e. the light enters the medium of the prism at a changed angle. The degree of bending of the light path is related to the angle that the incident beam of light makes with the surface, as well as on the ratios of the refractive indices between the two media, e.g. air/glass. Thus, it is understood that the differences in the refraction of light transmitted through the mounted prisms in this invention may be achieved in many ways: differences in the material composition of the materials used for the respective prisms; differences in the geometry of the prism, e.g. triangular or pentagonal; as well as differences in the position or angle at which the prism is mounted in the aperture.

Accordingly, with these variations in refraction, the refractive indices of the materials of the prism will vary with the color, i.e. wavelength of the color of the light being transmitted. This causes dispersion of the transmitted light. However, the resulting color of light that the viewer sees or perceives will be the color at the standard viewing angle of the screen. If the desire is to limit the effect of adjacent colors in any dispersed effect, a filter 50 made of any composition conventionally used in computer display privacy screens may be superimposed on the prisms.

Figure 3:
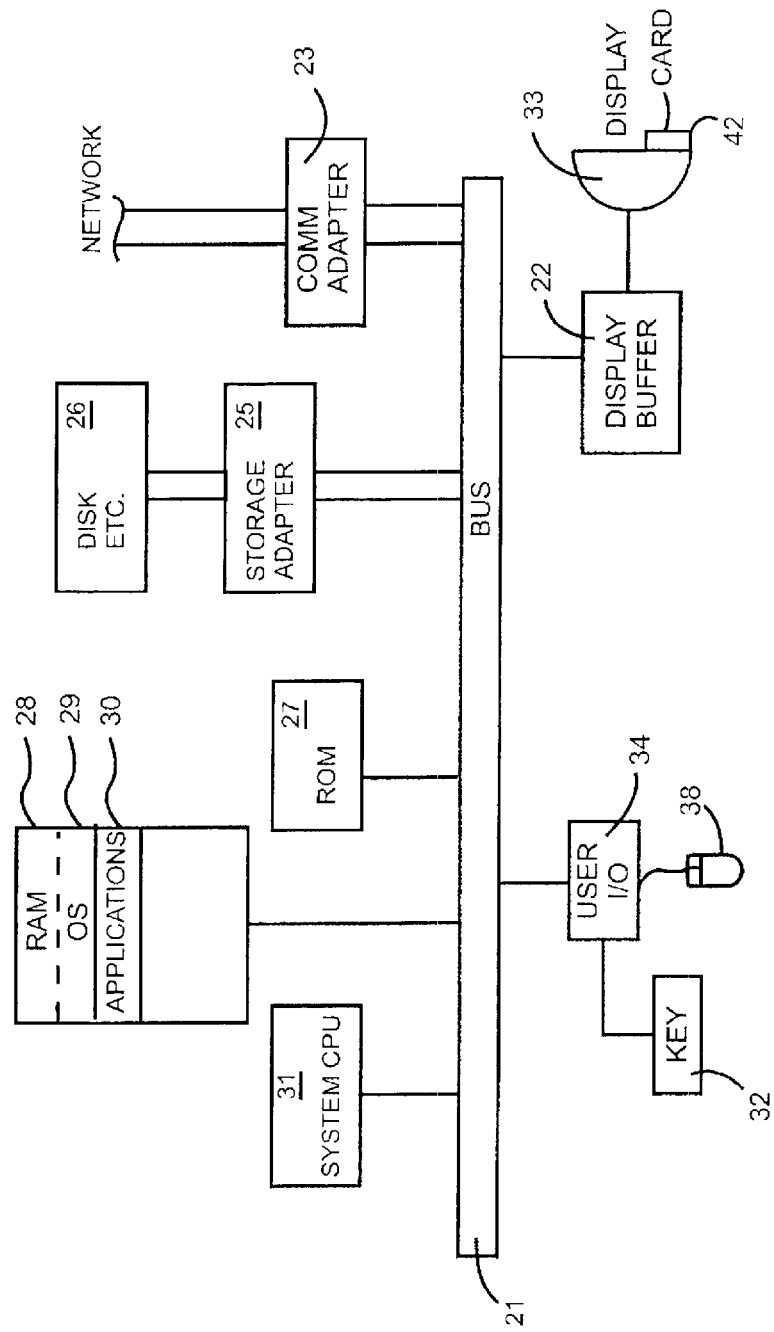
FIG. 3 is a general illustration of a computer controlled user interactive terminal display screen showing how the identifier card of this invention may be used to secure access.

The displayed Web page 40, FIG. 2, on Web computer terminal 10, FIG. 1, may conveniently use standard GIF (Graphical Interchange Format) images on the displayed Web pages provided from protected Web sites 14 through 16. Computer terminal 10, which may conveniently be any standard desktop, laptop or handheld display computer, may be implemented as shown in FIG. 3. A central processing unit (CPU) 31 is provided and interconnected to various other components by system bus 21. An operating system (OS) 29 runs on CPU 31, provides control and is used to coordinate the function of the various components of FIG. 3. OS 29 may be one of the commercially available operating systems. Application programs 30, controlled by the system, are moved into and out of the main memory Random Access Memory (RAM) 28. These programming applications may be used to implement functions of the present invention, e.g. the provision of the alignment markers for positioning of the identification cards on the display, and determining the position and initial screen colors at the positions in the apertures in the superimposed identification cards. Read Only Memory (ROM) 27 includes the Basic Input/Output System (BIOS) that controls the basic computer functions. RAM 28, storage adapter 25 and communications adapter 23 are also interconnected to system bus 21. Storage adapter 25 communicates with the disk storage device 26. Communications adapter 23 interconnects bus 21 with an outside Web or like network. I/O devices are also connected to system bus 21 via user interface adapter 34. Optionally, keyboard 32 and mouse 33 may be connected to bus 21 through user interface adapter 34. Where a display is used, display buffer 22 supports display 33, which identification card 42 abuts.

As mentioned hereinabove, display 33 provides a GIF interface, e.g. provides a color depth of 16 bpp (bits per pixel). The images and text of the display interface, e.g. the Web page 40 (FIG. 2) including alignment markers 41, the screen colors transmitted through apertures 44 and color chart 45 are generated using any standard graphic engine provided by the operating system.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements and/or components, but do not preclude the presence of one or more other features, integers, steps, operations, elements and/or components and/or groups thereof.

The corresponding structures, materials, acts and equivalents of all means or step plus function elements in the claims below are intended to include any structure, material or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to explain the principles of the invention and the practical application and to enable others of ordinary skill in the art to understand the invention for various embodiments with various modifications as are suited to the particular use contemplated.

What is claimed is:

1. A computer controlled display system with display screen user identification comprising:
    a displayed area providing a plurality of identifying colors respectively at positions within said area;
    a displayed alignment marker for aligning an identification card placed against said display screen with said area providing identifying colors;
    said identification card including:
        a planar member having a plurality of apertures formed therethrough; and
        a plurality of prisms, each respectively mounted in one of said apertures so as to produce a refraction of a color of light different from the refraction of a color of light transmitted through the other plurality of prisms;
    wherein said plurality of prisms respectively refract each of said identifying colors to provide a pattern of said refracted identifying colors representing a unique identification for said user;
    a displayed table enabling a viewer to convert said pattern of refracted identifying colors into an identifying numerical sequence and;
    data entry apparatus enabling said viewer to enter said numeric sequence to obtain access to said computer controlled displayed system.

2. The identification system of claim 1, wherein the refraction of a color of light produced by one of said prisms results from the composition of the prism.

3. The identification system of claim 1, wherein the refraction of a color of light produced by one of said prisms results from the geometric structure of the prism.

4. The identification system of claim 1, wherein the refraction of a color of light produced by one of said prisms results from the disposition of the prism within its respective aperture.

5. The identification system of claim 1, further including a plurality of privacy filters each respectively superimposed on one of said plurality of prisms, wherein a user's view is limited to said selected refracted colors.

6. The identification system of claim 1 wherein:
said display screen is displaying a Web page received from a secured site on the World Wide Web; and
said user identification is for a user requesting access to said secured site.

7. The identification system of claim 6 wherein said area providing said identifying color is integrated into the content of the Web page image.

8. A method for user identification in a computer controlled display system comprising:
displaying an area providing a plurality of identifying colors respectively at positions within said area;
displaying an alignment marker for aligning an identification card placed against said display screen with said area providing identifying colors;
transmitting each of said plurality of identifying colors through a respective one of a plurality of prisms, positioned coincident with said color to produce a refraction of a selected color of light different from the refraction of a color of light transmitted through the other prisms in said plurality of other apertures;
wherein each of said plurality prisms is respectively aligned with one of said identifying colors; and said plurality of prisms respectively refract each of said identifying colors to provide a pattern of said refracted identifying colors representing a unique identification for said user;
displaying a table enabling a user to convert said pattern of refracted identifying colors into an identifying numerical sequence; and
enabling said user to enter said identifying numerical sequence to obtain access to said computer controlled display system.

9. The method of claim 8 further including transmitting each of said refractions of a color of light through a privacy filter.

10. The method of claim 8 further including:
displaying a color hexagon including a spectrum of cells of differing colors; and
enabling said user to sequentially select cells of the colors corresponding to the pattern of said refracted identifying colors representing a unique identification for said user.

11. The method of claim 8 wherein:
said display screen is displaying a Web page received from a secured site on the World Wide Web; and
said user identification is for a user requesting access to said secured site.

12. The method of claim 11 wherein said area providing said identifying colors is integrated into the content of the Web page image.

* * * * *